(12) United States Patent
Allen et al.

(10) Patent No.: US 7,376,535 B1
(45) Date of Patent: May 20, 2008

(54) WIDEBAND MATCHING CIRCUIT AND METHOD OF EFFECTUATING SAME

(75) Inventors: Jeffery C. Allen, San Diego, CA (US); David F. Schwartz, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/586,743

(22) Filed: Oct. 12, 2006

(51) Int. Cl.
*H04L 25/00* (2006.01)
(52) U.S. Cl. .......................... 702/182; 702/57; 702/65; 702/189; 340/310.15; 333/17.3; 379/27.01; 375/257
(58) Field of Classification Search ................ 702/106, 702/107, 85, 57, 65, 72, 71, 182, 189, 75; 333/17.1–17.3, 32; 343/860–864, 749; 439/620.01, 439/620.09; 375/257, 130, 222, 254, 224, 375/227, 228; 455/125, 123, 276.1, 121, 455/129, 193.1; 379/27.01, 27.03, 30, 27.04, 379/1.01, 1.02; 340/310.15
See application file for complete search history.

(56) References Cited

U.S. PATENT DOCUMENTS

| | | | | |
|---|---|---|---|---|
| 4,233,608 A | * | 11/1980 | Moran et al. ................ 343/728 |
| 4,434,397 A | * | 2/1984 | Nelson ........................ 324/630 |
| RE39,051 E | * | 3/2006 | Harnett ....................... 702/106 |
| 7,034,629 B2 | * | 4/2006 | Tsironis ..................... 333/17.3 |
| 2002/0175878 A1 | * | 11/2002 | Toncich ....................... 343/860 |
| 2004/0091053 A1 | * | 5/2004 | Bargroff ..................... 375/257 |

* cited by examiner

*Primary Examiner*—Carol S Tsai
(74) *Attorney, Agent, or Firm*—Peter A. Lipovsky; J. Eric Anderson; Ryan J. Friedl (57) ABSTRACT

A method is provided for determining an optimal performance of a lossless circuit. In one embodiment, the number of inductors and capacitors contained in a circuit of interest are input, and then a random search of a plurality of lossless circuits, each having the same number of inductors and capacitors, is conducted. Then, the electrical load used by the circuit of interest is input into each of the plurality of lossless circuits. The method then searches for a circuit of the plurality of lossless circuits having the smallest mismatch between the electrical load and the circuit's input reflectance. The circuit having a lowest mismatch between the input electrical load and the circuit's input reflectance is then determined.

13 Claims, 4 Drawing Sheets

WIDEBAND MATCHING CIRCUIT AND METHOD OF EFFECTUATING SAME

FEDERALLY-SPONSORED RESEARCH AND DEVELOPMENT

This invention (Navy Case No. 83674) was developed with funds from the United States Department of the Navy. Licensing inquiries may be directed to Office of Research and Technical Applications, Space and Naval Warfare Systems Center, San Diego, Code 2112, San Diego, Calif. 92152; telephone (619) 553-2778; email: T2@spawar.navy.mil.

BACKGROUND OF THE INVENTION

1. Field of the Invention

The present invention generally relates to methods for impedance matching of circuits having a fixed degree. More specifically, but without limitation thereto, the present invention relates to a method, system and computer program product for a wideband impedance match for all lumped, lossless 2-ports of a degree not exceeding d using only two function calls to a numerical maximizer.

2. Description of the Related Art

Engineers utilize a variety of methods for constructing wideband impedance matching networks. Knowledge of the impedance function of a circuit element over a frequency band is important to determining its power consumption as well as to circuit design. For example, an engineer needs to know the impedance function of an antenna to match the impedance of the antenna to a transmission line. A circuit designer would benefit from the knowledge of what is the best performance possible for any impedance matching network as both a practical design goal and a quality indicator.

However, there are many circuit layouts, or topologies and many choices for reactive elements when modeling a network. This forces the engineer to undertake a massive search to determine an optimal circuit topology and reactive elements. Therefore, there exists a need to find a faster way to model a network.

SUMMARY OF THE INVENTION

One embodiment of a wideband impedance matching algorithm as described herein is directed to overcoming the problems described above, and may provide further related advantages.

For example, one embodiment provides a method of determining an optimal performance of a lossless circuit. The number of inductors and capacitors contained in a circuit of interest are input, and then a random search of a plurality of lossless circuits, each having the same number of inductors and capacitors is conducted. Then, the electrical load used by the circuit of interest is input into each of the plurality of lossless circuits. The circuit having a lowest mismatch between the input electrical load and the circuit's input reflectance is then determined. No embodiment of the present invention described herein shall preclude other embodiments or advantages that may exist or become obvious to those skilled in the art.

Put differently, the above embodiment of a wideband impedance matching algorithm known as a State-Space Impedance Matching (SSIM) algorithm comprises a predictor for optimal wideband impedance matching that computes the wideband transducer power gain (WTPG) over all lumped, lossless 2-port circuits of a degree not exceeding d using only two function calls to a numerical maximizer employed by a MATLAB computer program.

For example, one embodiment of the SSIM algorithm comprises a method of determining an optimal performance of a lossless broadband impedance matching network of degree d. First, a plurality n matrices $\theta_n$ corresponding to a plurality of matching network topologies of the degree d are selected. Then, a plurality of augmented scattering matrices responsive to the matrices $\theta_n$ are determined. A plurality of power mismatches $\Delta P$ of a load with respect to a generator utilizing the matching network topologies (i.e., circuit layouts) are then calculated, and then an output signal representative of a smallest of the power mismatches is generated.

A capability of the SSIM algorithm is that the optimal circuit layout, or topology and reactive elements can be quickly determined without resort to a massive one-by-one analysis of possible choices.

Another capability of the SSIM algorithm is that the feasibility of a design objective for an impedance matching network may be determined before the network is built.

These and other capabilities and advantages will be appreciated from review of the following Detailed Description of the Embodiments, along with the accompanying figures in which like reference numerals are used to describe the same, similar or corresponding parts in the several views of the drawings.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE EMBODIMENTS

Impedance matching is an engineering procedure employed in circuit design for matching unequal source and load impedances. Impedance matching is required in order to optimize the power delivered to the load from the source. Impedance matching is accomplished by inserting matching networks into a circuit between the source and the load. A simple example might involve matching unequal source and load resistances with an inductance(L)-capacitance(C) circuit, or perhaps optimizing the gain of an amplifier.

For example, the selection of a lossless 2-port circuit that matches a generator to a load is ubiquitous in electrical engineering. The problem is to maximize the wideband transducer power gain (WTPG) over a selected class of lossless 2-port circuits. Typically, the electrical engineer fixes a circuit topology, selects the lumped reactive elements, constrains the element values, and then numerically maximizes the WTPG over the reactive element values. The number of reactive elements determines the degree d of the 2-port. The difficulty of this approach is that there are many circuit topologies and many choices for the reactive elements. This forces the engineer or designer to undertake a massive search to determine an optimal circuit topology and reactive elements.

One embodiment of a State-Space Impedance Matching (SSIM) algorithm as described herein maximizes the WTPG over all lumped, lossless 2-port circuits of degree not exceeding d using only two function calls to a numerical maximizer employed by a MATLAB computer program (a data-manipulation software package manufactured by The Mathworks Company of Natick, Mass.).

Figure 1:
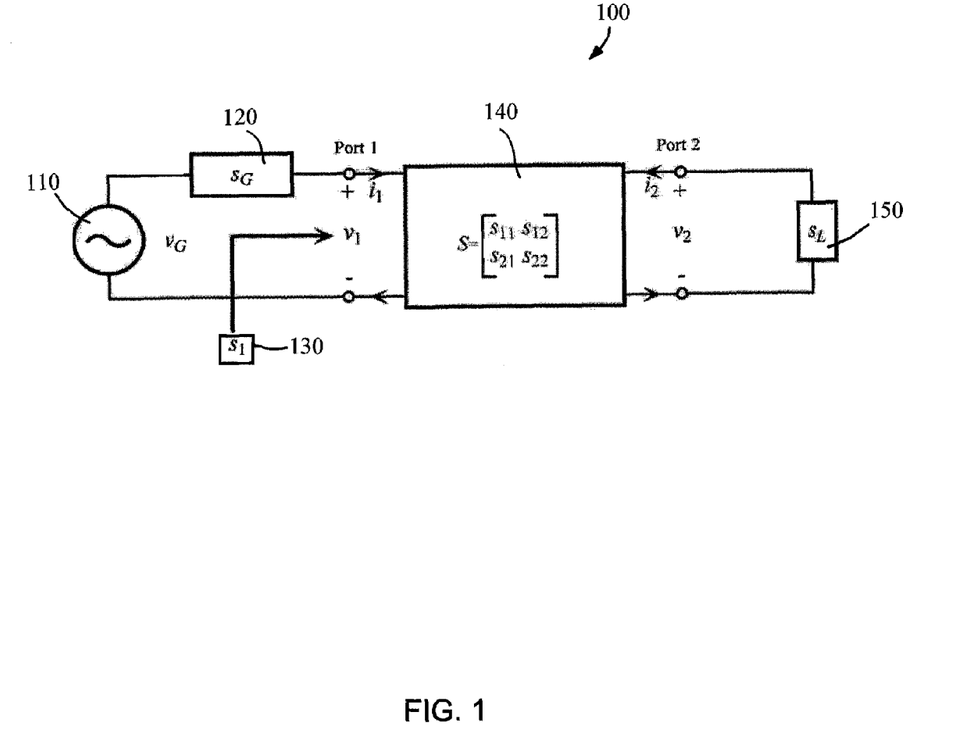
FIG. 1 is an illustration of a lossless 2-port circuit that minimizes the power mismatch between the generator and the load.

Referring now to FIG. 1, there is shown a circuit 100 which presents a matching problem of minimizing the power mismatch between a generator 110 and a load (not shown). Generator 110 with reflectance $s_G$ 120 is connected to Port 1 of a matching circuit 140. A load with reflectance $s_L$ 150 terminates at Port 2 of matching circuit 140. Circuit 100 includes the circuit's input reflectance 130 represented by $s_1$. The circuit's input reflectance is the reflectance at Port 1 when Port 2 is terminated in the load. One embodiment of the SSIM algorithm computes the smallest possible mismatch attainable over all lossless 2-port circuits of degree d.

Figure 2:
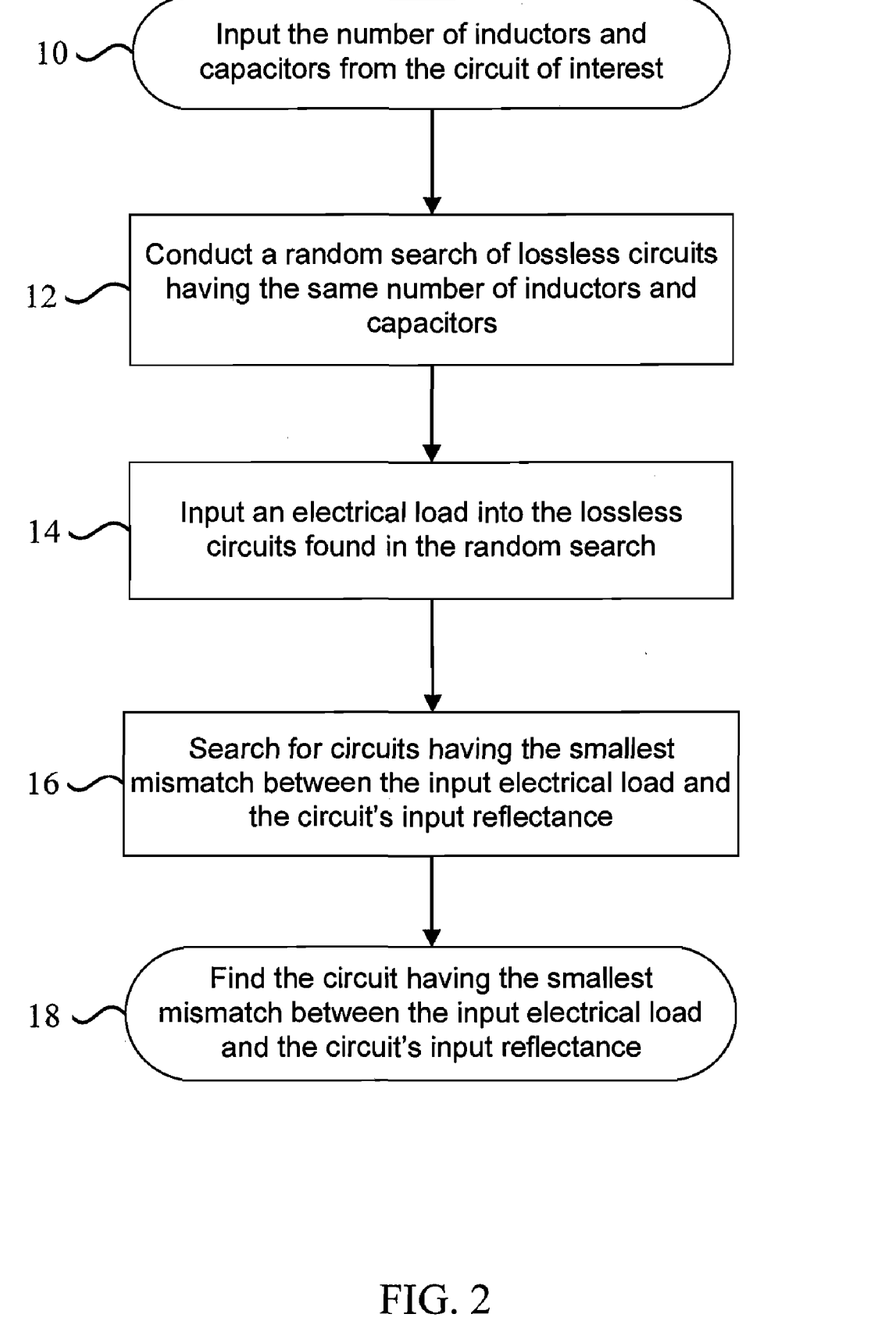
FIG. 2 is a flowchart illustrating one embodiment of a State-Space Impedance Matching (SSIM) algorithm.

FIG. 2 illustrates a flowchart of one embodiment of the SSIM algorithm. In step 10, the number of capacitors and inductors contained in a circuit for analysis is input. In step 12, the SSIM algorithm conducts a random search of lossless circuits having the same number of inductors and capacitors. In step 14, a simulated electrical load is input into the selection of lossless circuits found in the random search of step 12. In step 16, the SSIM algorithm obtains the results from step 14, and searches for circuits having the smallest mismatch between the input electrical load and the circuit's input reflectance. In one embodiment of the SSIM algorithm, step 16 searches for the circuit having the smallest numerical difference between the input electrical load and the circuit's input reflectance. In step 18 the SSIM algorithm finds the circuit having the smallest, or numerically lowest, mismatch between the input load and the circuit's input reflectance.

Figure 3:
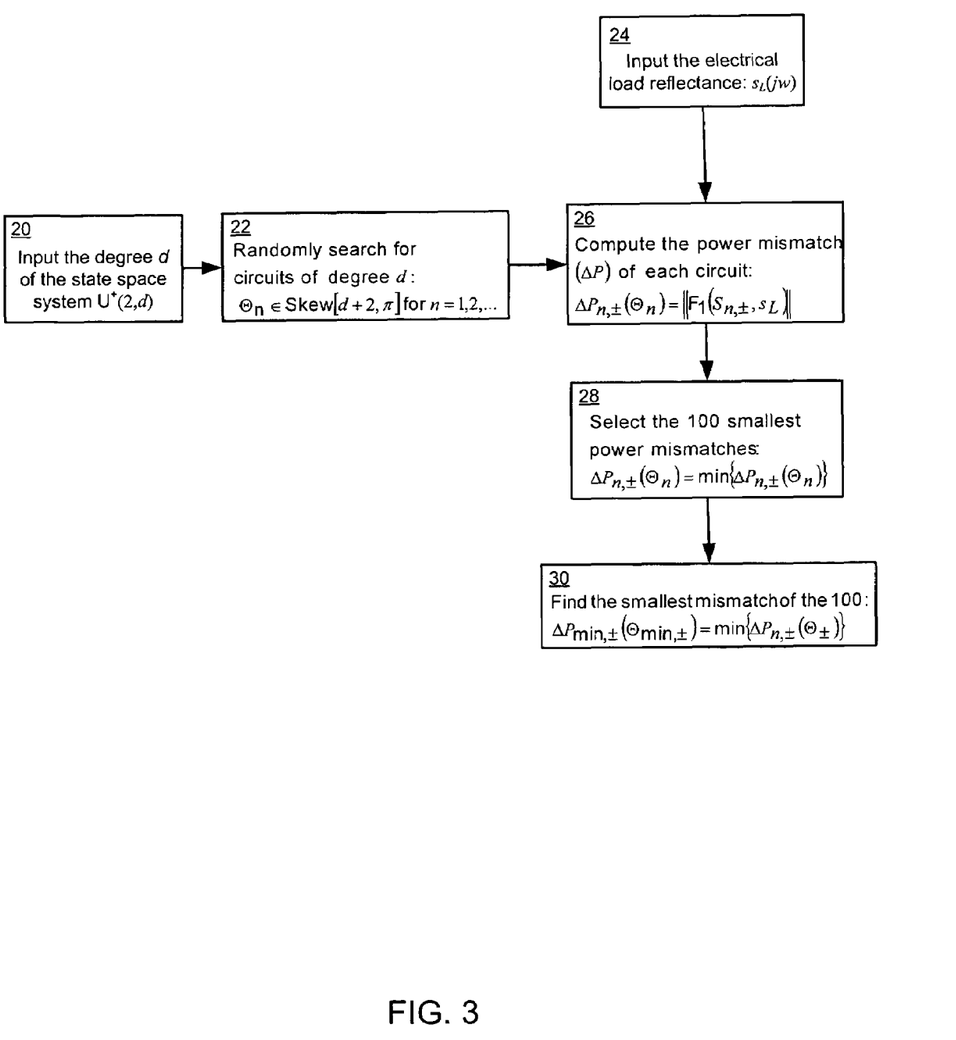
FIG. 3 is a flowchart illustrating another embodiment of the SSIM algorithm.

Referring now to FIG. 3, a more detailed flowchart of one embodiment of the SSIM algorithm is illustrated. This flowchart contains equations used in the MATLAB program constructed according to one embodiment of the SSIM algorithm. In step 20, the degree d of the state space system is input into the SSIM algorithm. Put differently, the total number of inductors and capacitors contained in the circuit (i.e., state space system) comprise the degree d. In step 22, the SSIM algorithm randomly searches for circuits of the input degree d. In step 24, a simulated electrical load ($s_L(jw)$) is input into the selection of lossless circuits found in the random search of step 22. In step 26, the SSIM algorithm computes the power mismatch ($\Delta P$) of each circuit. Put differently, the power mismatch is the difference between the input electrical load and the circuit's reflected output. In step 28, the 100 smallest, or numerically lowest power mismatches are selected. In step 30, the smallest, or numerically lowest of the 100 power mismatches selected in step 28 is determined.

The following discussion is a more detailed description of the SSIM algorithm. A load reflectance $s_L(p)$ and generator reflectance $s_G(p)$ are given over a frequency band $\Omega$, where $p=\sigma+j\omega$ denotes complex frequency. The generator and load are connected by a 2-port circuit having a scattering matrix $S(p)$ of:

$$S(p) = \begin{bmatrix} s_{11}(p) & s_{12}(p) \\ s_{21}(p) & s_{22}(p) \end{bmatrix}.$$

It follows that the reflectance looking into Port 1 with Port 2 that terminated in $s_L(p)$ is $$s_1(p) = F_1(S, s_L; p)s_{11}(p) + s_{12}(p)s_L(p)\{1 - s_{22}(p)s_L(p)\}^{-1}s_{21}(p).$$

The matching problem is to find a lumped, lossless 2-port circuit of a specified degree that maximizes the wideband transducer power gain over the frequency band $\Omega$. Or, equivalently the matching problem is to find a lumped, lossless 2-port circuit of a specified degree that minimizes the power mismatch $\Delta P$ over $\Omega$. This $\Delta P$ power mismatch is expressed as:

$$\Delta P(s_G, s_1; \Omega) = sup\left\{ \left| \frac{s_G(j\omega) - \overline{s_1(j\omega)}}{1 - s_G(j\omega) - s_1(j\omega)} \right| : \omega \in \Omega \right\}$$

where the overline denotes a complex conjugate, and "$\omega$" is the radian frequency (i.e, $2\pi\times$frequency in Hertz), and $s_G$ is the generator reflectance.

Generally, the lumped, lossless 2-port circuits are constructed from wires, transformers, coupled coils, gyrators, at most $N_L$ inductors, and at most $N_C$ capacitors. This forces the corresponding scattering matrices $S(p)$ to be real and rational:

$$deg_{SM}[S(p)] \leq N_L + N_C = d$$

where $deg_{SM}[S(p)]$ is defined as the Smith-McMillan degree of each scattering matrix $S(p)$, where the Smith-McMillan degree is the number of capacitors and inductors in the circuit.

Now, let $U^+(2,d)$ denote this collection of scattering matrices. Thus, the matching problem is to minimize the power mismatch $\Delta P_{min}$ between an input electrical load and a reflected output by sweeping over all the scattering matrices in $U^+(2,d)$, which is expressed as:

$$\Delta P_{min} := min\{\Delta P(s_G, F_1(S, s_L); \Omega) S \in U^+(2,d)\},$$

where the "min" makes it explicit that a solution exists, and $S_G$ is the generator reflectance, $S_L$ is the load reflectance, and $F_1$ is a function of S and $S_L$, as discussed, and defined above. One capability of the SSIM algorithm is that it provides a numerically efficient parameterization of $U^+(2,d)$.

In the equations and representations that follow, real numbers are denoted by R. The real M×N matrices are denoted by $R^{M\times N}$. The transpose of a matrix $\theta \in R^{M\times N}$ is denoted by $\theta^T$. The M×M identity matrix is denoted by $I_M$. A matrix is said to be skew-symmetric provided $\theta = -\theta^T$. The $\pi$-section of the real skew-symmetric matrices is denoted as:

$$Skew[2+d, \pi] := \{\Theta \in R^{(2+d)\times(2+d)} : \Theta^T = -\Theta, |\Theta(m_1, m_2)| \leq \pi\}.$$

What follows is a description of one embodiment of the SSIM Algorithm. First, define the map exp: Skew[2+d, $\pi$]$\rightarrow R^{(2+d)\times(2+d)}$ and the associated partition as follows:

$$S_a = \begin{bmatrix} S_{a,11} & S_{a,12} \\ S_{a,21} & S_{a,22} \end{bmatrix} = \sum_{n=0}^{\infty} \frac{\Theta^n}{n!} = \exp(\Theta),$$

where $S_{a,11} \in R^{2 \times 2}$ and $S_{a,22} \in R^{d \times d}$. The matrix $S_a$ is called the augmented scattering matrix and determines the scattering matrix $S(p)$ of a lossless 2-port circuit as a state-space matrix. The State-Space parameterization of $U^+(2,d)$ consists of two mappings $F_\pm$: $\text{Skew}[2+d,\pi] \to U^+(2,d)$ $$S(p) = F \pm (\Theta; p) \qquad \text{EQUATION}$$

$$= s_{a,11} + s_{a,12}\sigma \pm \left\{ \frac{p+1}{p-1} Id - S_{a,22}\sigma \pm \right\}^{-1} s_{a,21},$$

where $\sigma_\pm$ denotes the d×d diagonal matrix $$\sigma \pm = \begin{bmatrix} 1 & 0 & \ldots & 0 & 0 \\ 0 & 1 & & 0 & 0 \\ \vdots & & \ddots & & \vdots \\ 0 & 0 & & 1 & 0 \\ 0 & 0 & \ldots & 0 & \pm 1 \end{bmatrix}.$$

The scattering matrices of the lumped, lossless 2-ports of degree at most d admit the following state-space parameterization:

$$U^+(2,d) = F_+(\text{Skew}[2+d,\pi]) \cup F_-(\text{Skew}[2+d,\pi]).$$

Minimizing $F_+$ and $F_-$ over the skew-symmetric matrices is equivalent to the minimization in the above labeled "Equation."

Presented below is one embodiment of a high-level implementation of the state-space parameterization for computing a smallest power mismatch between an input electrical load and an output reflectance of an electrical circuit:

Inputs:
The sample frequencies: $\Omega = \{\omega_n: n=1, \ldots N_\Omega\}$.
The reflectance of the generator at the sample frequencies: $s_G(j\Omega_n)$.
The reflectance of the load at the sample frequencies: $s_L(j\Omega_n)$
The degree d.

Computation:

$$\Delta P_\pm = \min\{\Delta P(s_G, F_1(F_\pm(\Theta), s_L; \Omega): \Theta \in \text{Skew}[d+2,\pi]\}$$

Output:

$$\Delta P_\pm = \min\{\Delta P_+, \Delta P_-\}.$$

This completes the high-level description of one embodiment of the SSIM Algorithm. The listing of one embodiment of the SSIM algorithm is presented below in the form of a computer program in MATLAB.

Figure 4:
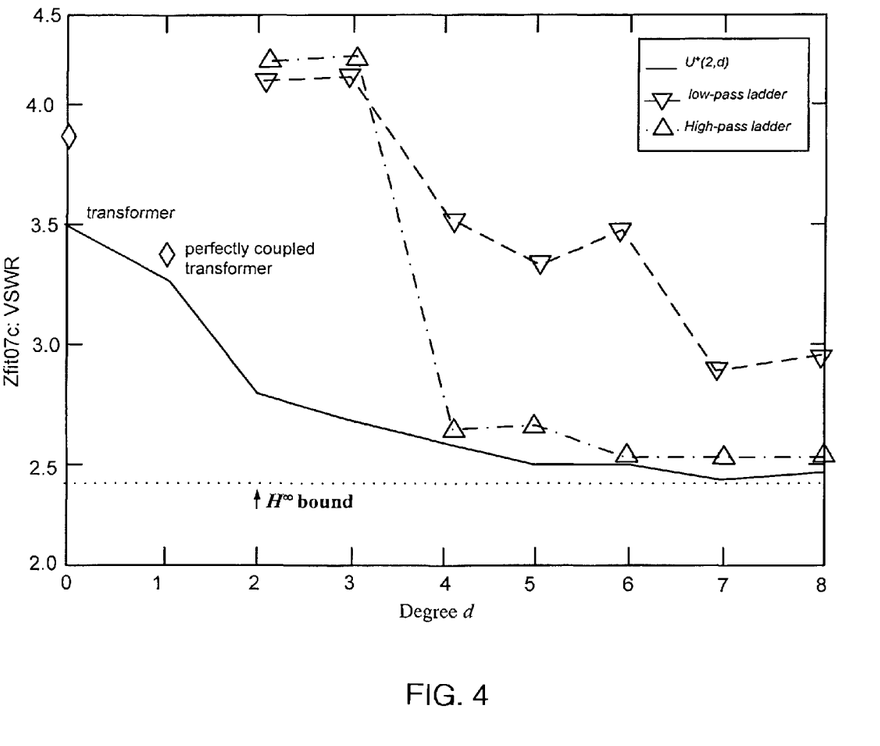
FIG. 4 is a graphical illustration of an output of one embodiment of the SSIM algorithm showing a comparison of the performance of several classes of 2-port circuits for a High Frequency (HF) antenna.

Below is one example of the SSIM algorithm applied to the problem of matching a High Frequency (HF) antenna, as shown in FIG. 4, which illustrates the matching performance of several classes of 2-ports for a HF antenna.

Reflectances were measured on the forward-mast integrated HF antenna on a brass scale-model of the LPD17, an amphibious transport ship. Matching for this antenna is over 401 frequency samples taken between 9 to 30 MHz. For antenna matching, the voltage standing-wave ratio (VSWR) is a common design criterion. The VSWR relates to the transducer power gain as:

$$VSWR = \frac{1 + \Delta P}{1 - \Delta P}.$$

Increasing the power mismatch increases the VSWR, so the impedance matching problem is equivalent to minimizing the VSWR. FIG. 4 shows the VSWR as function of the degree of the matching circuit. The dashed lines are the VSWR computed from low- and high-pass ladders containing inductors and capacitors constrained to practical values. The solid line is the VSWR estimated from $U^+(2, d)$ using the state-space algorithm. The dashed line is the best possible VSWR over all lumped, lossless 2-ports.

The example shown in FIG. 4 allows an easy assessment of a specific circuit topology against an arbitrary topology. At degree d=0, the transformer performs almost as well as any non-reactive lossless 2-port. At degree d=1, the perfectly coupled transformer is nearly optimal against $U^+(2,1)$. At degrees d=2 and 3, the low- and high-pass ladders are not optimal but the high-pass ladder is nearly optimal for d≧4. The figure reveals that there exist matching circuits of degree 2 with nearly the same performance as the high-pass ladder for d≧4. Thus, the state-space method lets the circuit designer know that a search over the circuit topologies for d=2 admits a payoff in a nearly optimal circuit. More generally, the state-space method offers the circuit designer a graphical assessment of the performance a specific matching circuit against an arbitrary topology.

One capability of the SSIM algorithm is that the matching bounds computed by the SSIM Algorithm permit a candidate matching circuit to be benchmarked against the matching performance available from all circuits of the same degree d. If the candidate matching circuit is near the matching bound computed by the SSIM Algorithm, then the candidate matching circuit may be accepted. If the candidate matching circuit is not near the matching bound computed by the SSIM Algorithm, then a search for other circuit layouts, or topologies may be performed.

For example, the HF antenna example, discussed above, and illustrated in FIG. 4, demonstrates that the high-pass ladders were nearly optimal for d≧4. However, the SSIM Algorithm also demonstrates that there exist matching circuits of degree d=2 that are nearly as optimal as these ladders. Then either the high-pass ladders with d≧4 can be used for matching or, the search for matching circuits can be focused on matching circuits of degree d=2.

From a numerical standpoint, the SSIM Algorithm is remarkable because it gives a zero- and pole-free parameterization of $U^+(N, d)$ using the compact r-section of the skew-symmetric matrices. In this parameterization, all variables are angles in $[-\pi,\pi]$ and so are numerically "equivalent". There are no physically distinct variables, no unbounded regions, no factorizations of polynomials, and no scaling problems.

The present embodiments are in contrast to previous impedance-matching programs that are either device specific or circuit layout (i.e., topology) specific, which therefore, do not admit a comparison with the SSIM Algorithm. Put differently, neither the engineering community nor the mathematical community matches impedance independent of circuit layout, or topology. Thus, the state-space parameterization of $U^+(2, d)$ and its application to impedance matching, as provided by the SSIM Algorithm, provides a new method of impedance matching.

The following discussion is intended to provide a brief, general description of a suitable computing environment in which the invention may be implemented. Although not required, the invention as described above is described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

As will be appreciated by one of skill in the art, embodiments as described above may be provided as methods, systems, or computer program products. Accordingly, embodiments of the SSIM algorithm may take the form of an entirely software embodiment or an embodiment combining software and hardware aspects. Furthermore, embodiments of the SSIM algorithm may take the form of a computer program product which is embodied on one or more computer-usable storage media (including, but not limited to, disk storage, CD-ROM, optical storage, flash memory storage, and so forth) having computer-usable program code embodied therein.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowcharts illustrated in FIGS. 2 and 3.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions described above.

Thus, it is seen that a computer program for finding the wideband impedance matching over all lumped, lossless 2-port circuits of a degree not exceeding d using only two function calls to a numerical maximizer is provided. For example, the following is an exemplary computer program of the SSIM algorithm in MATLAB, as a function titled SSIM (State-Space Impedance Matching) Algorithm:

The SSIM Algorithm

This section presents a MATLAB implementation of the State-Space Impedance Matching (SSIM) Algorithm. The main program sets up the parameters for MATLAB's minimizer "fmincon." Each search starts by initializing the minimizer to search over each F $F_\pm$(Skew[2+d,$\pi$]) by uniformly randomly selecting Nrep elements from Skew[2+d, $\pi$] and starting the search at that random point with the smallest power mismatch. The power mismatch is computed by calling the power mismatch function "zfit07err."

Inputs: The main program starts by assuming the samples of the load's reflectance $s_L(j2\pi f_k)$ at frequencies $f_k$ for k= 1, . . . , K are loaded into the corresponding vectors:

sL: =reflectance of the load f: =frequency vector

Main Program

```
% 1.4 Convert to complex frequency p*sigma + j*omega
SF      =       2*pi*max(f);
w       =       2*pi*f/SF;
p       =       j*w;
q       =       (p+1)  ./  (p-1);
% 2. Set up the matching 2-port
% 2.1 Select the order of the system
d               = input ('Enter the order of the system <4>: ');
if isempty(d); d = 4; end;
Na      = d + 2;
Na      = Na*(Na-1)/2;
% 2.2 Set bounds on A for S = expm(A)
aBnd    = pi;
aLB=    -aBnd*ones(Na,1);
aUB=    aBnd*ones(Na,1);
% 2.2 Diagonal matrices for +/- subset collection
SigmaPos        =  eye(d);
SigmaNeg        =  eye(d);
SigmaNeg    (end,end)  =  -1
% 3. Numerical Minimization
% 3.1 Evade non-differentiable regions
pNorm = input('Enter p-norm fix <100>: ');
if isempty(pNorm); pNorm = 100; end
% 3.2 Landing conditions
options = optimset (               ...
'Display ', 'iter '                ...
, 'Largescale ',  'off '           ...
, 'MaxFunEval',  5000*Na  );
% 3.4 Number of initial guesses to start the minimizers
Nrep = input('Enter number of guesses <100>: ');
if isempty (Nrep); Nrep = 100; end
% 3.4 Positive subset
% 3.4.1 Initialize the minimizer over the positive subset
a0          = zeros(Na,1);
dP0= zfit07err(a0,q,sL,SigmaPos);
for n=1:Nrep
    a       =       -aBnd + 2*aBnd*rand(Na,1);
    dP      =       zfit07err(a,q,sL,SigmaPos);
    if dP < dP0
        a0 = a;
        dP0 = dP;
    end
end
% 3.4.2 Search over the positive subset
a0ptPos = fmincon('zfit07err', a0, [ ], [ ], [ ], [ ] ...
, aLB, aUB, [ ], options, q, sL, SigmaPos, pNorm );
% 3.5 Negative subset
% 3.5.1 Initialize the minimizer over the negative subset
a0          = zeros(Na,1);
dP0= zfit07err(a0,q,sL,SigmaNeg);
for n=1:Nrep
    a       =       -aBnd + 2*aBnd*rand(Na,1);
    dP      =       zfit07err(a,q,sL,SigmaNeg);
    if dP < dP0
        a0 = a;
        dP0= dP;
    end
end
% 3.5.2 Search over the negative subset
a0ptNeg  = fmincon('zfit07err', a0, [ ], [ ], [ ], [ ] ...
, aLB, aUB, [ ], options, q, sL, SigmaNeg, pNorm );
% 3.6 Select the optimal subset
[dPPos,s1Pos]           = zfit07err(a0ptPos,q,sL,SigmaPos);
[dPPos,s1Neg]           = zfit07err(a0ptPos,q,sL,SigmaNeg);
if     dPPos < dpNeg
    dP0pt   =    dPPos;
    a0pt    =    a0ptPos;
    s1      =    s1Pos;
else
```

-continued
```
      dP0pt    =    dPNeg;
      a0pt     =    a0ptNeg;
      s1       =    s1Neg;
end
```

Power Mismatch Function

```
Function [dP, s1, A, B, C, D, S] =
zfit07err ( a, q, sL, Sigma, pNorm, sG);
%================================================
%     [dP, s1, A, B, C, D] = zfit07err ( a, q, sL, Sigma, pNorm);
%
%     Power mismatch computation:
%
%
%         +-- sG --o--|                        |------o
%       + |           |                        |
%         |  vG s1 -->| Lumped, lossless       |       sL
%       - |           |    2 port S(p)         |
%         +--------o--|                        |------o
%
%
%     Computes the power mismatch [2, Lemma 5]:
%
%                    | conj(sG) – s1 |
%         dp(sG, s1) = | ------------- |
%                    |   1 – sG's1   |
%
%     between the generator's reflectance sG and the reflectance
%     looking into Port 1 [2, page 2]:
%
%     s1(p) = s11(p) + s12(p) sL(p) (1 – s22(p) sL(p))^{-1} s21(p),
%
%     where sL(p) is the reflectance of the load, and the
%     lumped lossless 2-port has 2-by-2 scattering matrix S(p)
%     determined by the input vector "a" and matrix Sigma.
%
%     1. S(p)
%     The 2-by-2 scattering matrix S(p) is parameterized by the
%     augmented scattering matrix
%
%         S_a = [ S_a,11  S_a,12 ]
%               [ S_a,21  S_a,22 ]
%
%     terminated in a network of inductors and capacitors called the
%     augmented load
%
%         S_L(p) = Sigma * (p–1)/(p+1).
%
%     giving the LFT representation of Theorem 3.3 [1]:
%
%         S(p) = S_a,11 + S_a,12 S_L(p) ( I –
%         S_a,22 S_L(p) )^{-1}S_a,21
%
%     the augmented scattering matrix belongs to S0[N+2] and is
%     computed by
%
%         S_a = exp(A)
%
%     where A=–A^T is real skew-symmetric (A(:)=a).
%
%     2. MATLAB USEAGE: To exploit the state-space formulas,
%     set q=[(p–1)/(p+1)]^{-1} to convert
%
%         W(q) = D + C ( q – A )^{-1} B
%
%              = S11 + S12
%                Sigma ( q – S22 Sigma )^{-1}S21
%
%     For speedy evaluation, convert to the 2-by-2 matrix and compute
%
%     s1(p) = s11(p) + s12(p) sL(p) (1 – s22(p) sL(p))^{-1} s21(p),
%
%     CALLED BY: zfit07.m, zfit07b.m, zfit07c.m
%================================================
%     1. Defaults
%     1.1 Default to sup norm
if nargin < 5 | isempty(pNorm)
     pNorm = Inf;
end
%     1.2 Default to sG=0
if nargin < 6 | isempty(sG)
     sG = 0;
end
%     2. Compute augmented scattering matrix
%     2.1 Convert to the skew-symmetric matrix
N = sum{ length(Sigma) } + 2;
S = zeros (N);
X = a(:);
for   n = 1:N-1
    index       = 1:(N-n);
    S(1+n:N,n)  = x(index);
    X(index)    = [ ];
end
%     2.2 Exponentiate to get the augmented scattering matrix
in S0[2+N]
s = expm(S – S.');
%     2.3 Convert to state space
D = S(1:2,1:2);
C = S(1:2,3:N) *Sigma;
B = S(3:N,1:2);
A = S(3:N, 3:N) *Sigma;
%     3. Map the augmented scattering matrix to S(p)
[bb,aa]    = ss2tf(A,B,C,D,1);
g          = polyval (aa,q);
s11        = polyval (bb(1,:),q) ./ g;
s21        = polyval (bb(2,:),q) ./ g;
[bb,aa]    = ss2tf(A,B,C,D,2);
s12        = polyval (bb(1,:),q) ./ g;
s22        = polyval (bb(2,:),q) ./ g;
%     4. Terminate Port 2 of the 2-port on the reflectance sL(p)
%     of the load
s1 = s11 + s12.*sL.*(1–s22.*sL).–(–1). *s21;
%     5. Check for numerical problems
If    –all(isfinite(s1))
disp(['Warning: non-finite terminated load']);
disp(['Printing: skew vector and bailing']);
      a
      error;
end
%     6. Power mismatch
dP = norm( (conj(sG) – s1)./(1 – sG*s1) , pNorm );
```

What is claimed is:

1. A method of determining an optimal performance of a lossless circuit, the method comprising the steps of:

inputting a number of inductors and a number of capacitors from a circuit;

conducting a random search of a plurality of lossless circuits having a same number of inductors and capacitors;

inputting an electrical load into each of the plurality of lossless circuits found in the random search;

searching for a circuit of the plurality of lossless circuits having the smallest mismatch between the electrical load and the circuit's input reflectance; and finding the circuit of the plurality of lossless circuits having the smallest mismatch between the input electrical load and the circuit's input reflectance.

2. A method of determining an optimal performance of a lossless broadband impedance matching network of a degree d, the method comprising the steps of:

selecting a plurality n matrices $\Theta_n$ corresponding to a plurality of matching network topologies of the degree d;

determining a plurality of augmented scattering matrices responsive to each of the plurality of matrices $\Theta_n$;

calculating a plurality of power mismatches ΔP of a load with respect to a generator included in each of the plurality of matching networks topologies of the degree d; and generating an output signal representative of a smallest of the power mismatches.

3. The method of claim 2, further comprising the step of imputing at least one system parameter selected from a group consisting of: a plurality of reflectance $S_L$ with corresponding frequency values for the load, and a plurality of reflectance $S_G$ with corresponding frequency values for the generator.

4. The method of claim 2, wherein the step of determining the plurality of augmented scattering matrices further comprises a sub-step of converting the matrices $\Theta_n$ to a plurality of skew-symmetric matrices.

5. The method of claim 4, wherein the plurality of skew symmetric matrices $\Theta_n$ are elements of real M×N matrices, wherein M and N are real numbers.

6. The method of claim 4, wherein the plurality of skew symmetric matrices are confined to a range of $\pi \leq \Theta_n(m_1, m_2) \leq \pi$, wherein $m_1$ and $m_2$ are elements of the $\Theta_n$ matrix.

7. The method of claim 4, wherein the step of determining the plurality of augmented scattering matrices further comprises a sub-step of exponentiating the skew-symmetric matrices.

8. The method of claim 7, wherein the step of determining the plurality of augmented scattering matrices further comprises a sub-step of converting the exponentiated skew-symmetric matrices to state-space matrices.

9. The method of claim 2, wherein the step of calculating a plurality of power mismatches further comprises a sub-step of mapping the augmented scattering matrices to a state-space scattering matrix S(p) of a lossless matching network having a first port and a second port.

10. The method of claim 9, wherein the step of calculating a plurality of power mismatches further comprises a sub-step of terminating the second port of the lossless matching network with the reflectance $S_L$ of the load.

11. The method of claim 2, further comprising a step of inputting the degree d.

12. A computer program product for use with a wideband impedance matching system, the computer program product embodied on one or more computer-usable media and comprising:

computer readable program code means for directing the wideband impedance matching system to select a plurality n matrices $\Theta_n$ corresponding to a plurality of matching network topologies of degree d;

computer readable program code means for directing the wideband impedance matching system to compute a plurality of augmented scattering matrices responsive to the matrices $\Theta_n$;

computer readable program code means for directing the wideband impedance matching system to calculate a plurality of power mismatches ΔP of a load with respect to a generator included in each of the plurality of matching network topologies of the degree d; and computer readable program code means for directing the wideband impedance matching system to generate an output signal representative of a smallest of the power mismatches.

13. The computer program product of claim 12, further comprising an input means for directing the wideband impedance matching system to input a system parameter selected from a group consisting of: an impedance of the load, an impedance of the generator, an operating frequency band, the degree d, and the number n.

* * * * *